M. Neckermann.
Chuck,
Nº 14,632. Patented Apr. 8, 1856.
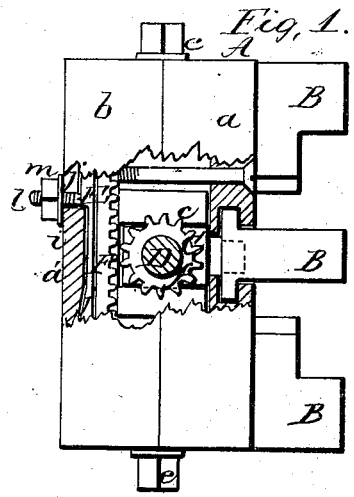
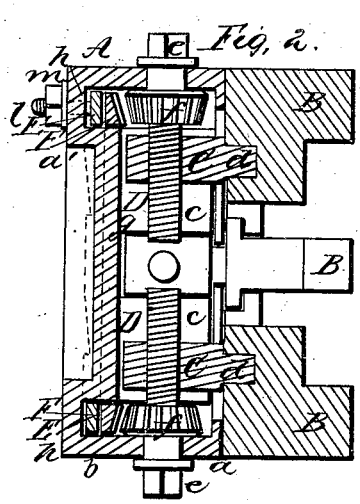
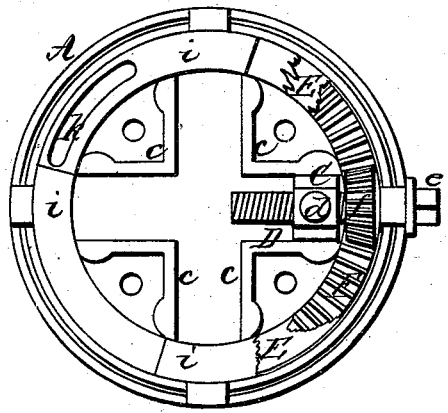

UNITED STATES PATENT OFFICE.

MICHAEL NECKERMANN, OF PITTSBURGH, PENNSYLVANIA.

CHUCK FOR LATHES.

Specification of Letters Patent No. 14,632, dated April 8, 1856.

*To all whom it may concern:*

Be it known that I, MICHAEL NECKERMANN, of Pittsburgh, in the county of Allegheny and State of Pennsylvania, have invented a new and Improved Chuck for Lathes; and I do hereby declare that the following is a full, clear, and exact description of the same, reference being had to the annexed drawings, making a part of this specification, in which—

Figure 1, is a side view of my improvement, a portion of the side being removed or broken away. Fig. 2, is a vertical section of ditto, the plane of section passing through the center of the chuck longitudinally with its axis. Fig. 3, is a view of the inner side of the back plate of the casing, a portion of the beveled toothed rim, and a portion of the rim back of the toothed rim being shown.

Similar letters of reference indicate corresponding parts in the several figures.

My invention consists in the employment or use of a beveled toothed rim, a movable rim with inclined projections upon it, which work over corresponding projections on the back plate of the casing of the chuck, the above parts being arranged as will be presently shown and described, so that the beveled rim may be thrown in and out of gear with pinions on the screw rods which operate the jaws, allowing the jaws to be so adjusted that they may be moved simultaneously toward the center of the face plate at equal or unequal distances from it, according to the form of the articles to be chucked.

To enable others skilled in the art to fully understand and construct my invention, I will proceed to describe it.

A, represents a cylindrical case which is formed of two parts $a$, $b$, connected or secured together by bolts in any proper manner. The outer or front side of the part $a$, is the face plate of the chuck and this face plate has two slots cut through it, said slots crossing each other at right angles directly at the center of the plate. The edges of the slots are grooved and jaws B, are fitted therein two in each slot at opposite sides of the center of the face plate. To the inner side of the end plate $a'$, of the part $b$, ledges $c$, are attached to form guides for nuts C, the outer ends of which have cylindrical projections or pins $d$, upon them which pins fit in the inner sides of the jaws B, as plainly shown in Fig. 2. Through each nut C, a screw D, passes. These screws pass through the side of the case A, and have squares $e$, on their outer ends. On each screw D, and within the case A, there is placed a bevel pinion $f$. The ledges $c$, are attached to a circular projection $g$, on the end plate $a'$. This projection is somewhat smaller in diameter than the plate $a'$, and an annular groove $h$, is consequently formed between the projection $g$, and the inner side of the part $b$, of the case as shown clearly in Fig. 2. The back of this groove has inclined projections $i$, upon it, and a circular rim E, is fitted loosely within this groove, the back of the rim having inclined projections $j$, upon it, which projections fit or work over the projections $i$, on the back of the groove $h$, see Fig. 1. The back of the groove $h$, has a curved slot $k$, made through it, and a screw rod $l$, which is attached to the rim E, passes through this slot, the rod $l$, having a nut $m$, on its outer end, see Figs. 1 and 2.

F, represents a beveled toothed rim which is fitted over the rim E.

From the above description of the parts it will be seen that by turning the rim E, by means of the rod $l$, the toothed rim F, may be thrown either in or out of gear with the pinions $f$, when the toothed rim F is in gear with the pinions $f$, all of the said pinions will be turned by turning either of the screws D, and the jaws B, will consequently be moved simultaneously toward or from the center of the face plate. The beveled toothed rim F, is operated or thrown in and out of gear by means of the inclined projections $i$, $j$, previously described.

By the above improvement the chuck may be used either as an eccentric or concentric one, and hence it may be termed a universal chuck. When used as a concentric chuck, the jaws B, are placed at equal distances from the center of the face plate so that the jaws will grasp cylindrical articles, but if elliptical or irregular forms are to be chucked the toothed rim F, is thrown out of gear with the pinions $f$, and the jaws being then allowed to work independently are adjusted at varying distances from the center of the face plate according to the form of the article to be chucked. The beveled toothed rim is then thrown in gear with the pinions and the jaws may be operated simultaneously as before.

I am aware that jaws have been previously operated by screws and toothed rims have also been used, the rims gearing into pinions on the screws, but the objections to these chucks are that the jaws are not adjustable or they cannot be set at both varying and equal distances from the center of the face plate, as may be desired, in order that the chuck may be used either as an eccentric or concentric one, or in other words grasp cylindrical or regular formed articles as well as those of irregular form. By my improvement, this objection is obviated.

I do not claim the beveled toothed rim F, nor the pinions $f$, on the screws D by which the jaws B are operated, for this device has been previously used but

What I claim as new and desire to secure by Letters Patent is,

The annular rim E having inclined projections $j$, fitting or working over projections $i$, on the back of the groove $h$. The toothed rim F, being placed over the rim E, the above parts being arranged substantially as shown for the purpose set forth.

MICHAEL NECKERMANN.

Witnesses:
E. AMREIN,
JOHN F. LEIBFARTH.